United States Patent Office 3,846,101
Patented Nov. 5, 1974

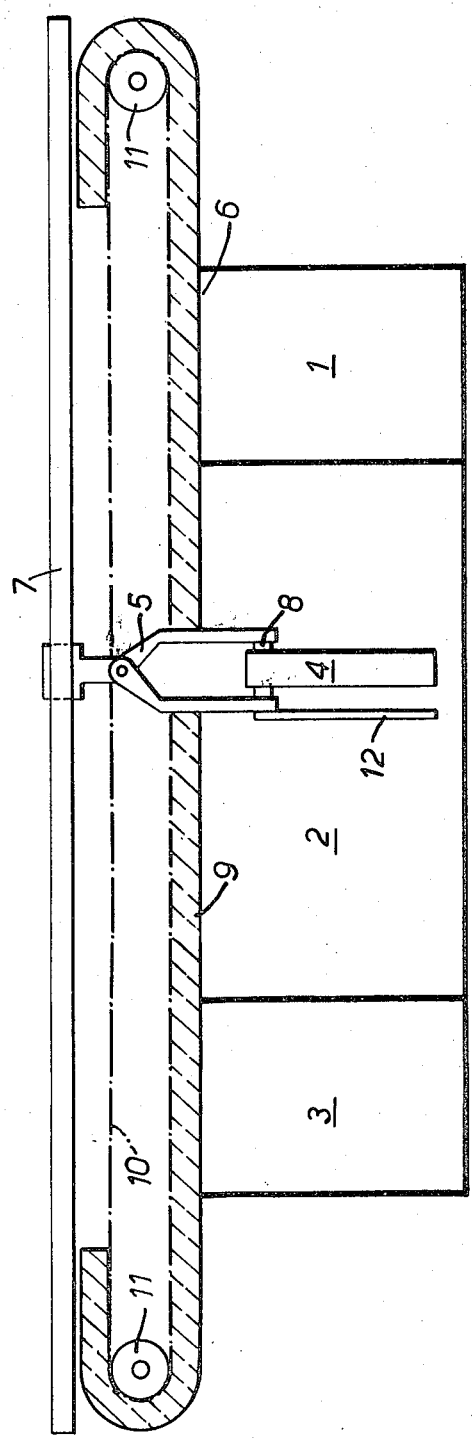

3,846,101
THERMALLY CRYSTALLIZING AN ARTICLE
WHILE SUPPORTED IN VERTICAL ATTITUDE
Philip Hedley Gaskell, Preston, James Peter Loftus, Wigan, and Jane Greengrass, Ormskirk, England, assignors to Pilkington Brothers Limited, St. Helens, Lancashire, England
Filed Aug. 1, 1973, Ser. No. 384,471
Claims priority, application Great Britain, Aug. 10, 1972, 37,428/72
Int. Cl. C03b 29/00
U.S. Cl. 65—33
10 Claims

ABSTRACT OF THE DISCLOSURE

A method of manufacturing a fine-grained glass ceramic article from a thermally-crystallisable vitreous material, comprising shaping the vitreous material to form a shaped article, heating the article at a temperature in the range $T_g$ to $T_g+100°$ C. (where $T_g$ is the transformation temperature of the vitreous material as determined by differential thermal analysis) to condition the material for subsequent crystallisation, and rapidly heating the article at a rate of at least 30° C. per minute to a predetermined crystallisation temperature to effect fine-grained crystal growth while the article is suspended in a substantially vertical attitude.

The initial heating at $T_g$ to $T_g+100°$ C. may be carried out in the course of the rapid heating to crystallisation temperature or it may be carried out as a separate step before the rapid heating. The article may be suspended during the initial heating as well as during the rapid heating to crystallisation temperature.

The method is particularly applicable to articles with a high degree of symmetry. The article is suspendingly supported with its major axis or plane of symmetry extending downwardly during the heating step to obtain crystallization. It can be carried out by transporting the suspended article through a three-zone furnace.

CROSS-REFERENCE TO RELATED APPLICATION

This Application is related to copending Application of Philip Hedley Gaskell et al., Ser. No. 226,857, filed Feb. 16, 1972, now Pat. No. 3,809,543 issued May 7, 1974.

BACKGROUND OF THE INVENTION

Field of the Invention

This invention relates to methods of manufacturing glass ceramic matterials.

Description of the Prior Art

It is known that certain glasses are capable of controlled crystallisation to form strong glass ceramic materials. For example glass ceramic materials have been made by crystallisation of glasses of the following systems:

$SiO_2$—$Al_2O_3$—$Li_2O$
$SiO_2$—$Al_2O_3$—$MgO$
$SiO_2$—$Al_2O_3$—$BaO$

The glass customarily contains a proportion of a nucleating oxide, e.g. $TiO_2$, $ZrO_2$ or $P_2O_5$.

Usually the homogeneous melt is shaped by conventional forming process, e.g. by moulding or extrusion, and in the course of the forming process the glass is cooled to a temperature at which it holds its shape. Thereafter the formed glass is held for a time, sometimes a matter of hours, to develop a degree of nucleation in the material, and thereafter the nucleated material is slowly heated at a rate, e.g. 5° C./min., at which, at the onset of crystallisation, the glass is still sufficiently viscous to hold its shape, and as the temperature rises further thereafter and the rate of crystallisation increases, a balance is struck between the increase in stiffness of the material due to its increasing crystallinity, and the decrease in viscosity of the vitreous matrix in which crystal growth is taken place. The preformed shape of the material is not then modified during the crystallisation process. The slow heating rate has also been thought necessary to ensure that no damaging stresses are generated within the material, which could cause cracking for example.

In copending Patent Application Ser. No. 226,857, there is described the discovery that crystallisation can occur on a dispersion of embryonic centres of incipient crystal growth in the material, which dispersion is itself insufficiently developed to produce a self-supporting network of crystals within the material, if the temperature of the material is rapidly raised from a temperature at which that dispersion exists to a selected crystallisation temperature range which is conducive to rapid crystal growth on those centres, and that the rapid raising of the temperature can permit internal stresses to be relieved without damaging the material.

On the basis of this discovery, that Application describes and claims a method of manufacturing a fine-grained glass ceramic material from a thermally- crystallisable vitreous material, comprising shaping the material and thereafter maintaining support of the shaped material, subjecting the supported material for a limited time to a temperature/time regime which generates throughout the material a uniform dispersion of embryonic centres of incipient crystal growth, and rapidly heating the material at a controlled rate to a predetermined crystallisation temperature to effect fine-grained crystal growth on those embryonic centres.

SUMMARY OF THE INVENTION

We have now found that a fine-grained glass ceramic material can be formed in a process which again utilises the formation of a uniform dispersion of embryonic centres of incipient crystal growth, and the use of a rapid heating process to cause crystal growth on those centres to take place, but does not involve the support of the article being treated against deformation.

According to the present invention, a method of manufacturing a fine grained glass ceramic article from a thermally-crystallisable vitreous material comprises shaping the vitreous material to form a shaped article, heating the article at a temperature in the range $T_g$ to $T_g$ +100° C., where $T_g$ is the transforamtion temperature of the vitreous material as determined by differential thermal analysis, to condition the material for subsequent crystallisation, and rapidly heating the article at a rate of at least 30° C. per minute to a predetermined crystallisation temperature to effect fine-grained crystal growth while the article is suspended in a substantially vertical attitude.

With the article thus suspended, the glass being treated is allowed to become sufficiently fluid so that crystallisation can take place under conditions in which damaging stresses are relieved, by local microscopic flow processes. During this process some small degree of distortion of the article may take place. The process is most easily applied to articles with a high degree of symmetry such as the axial symmetry found in a rod or tube, or the planar symmetry of a sheet. Such shapes can be crystallised while being supported with the axis or plane of symmetry lying in a substantially vertical position by clamps attached to one end of the article. In this configuration it is possible that distortion may occur due to gravity, which tends to cause the body to become elongated and may also cause some slight change of the dimension perpendicular to the axis or plane of symmetry of the article. There is however little tendency for the article to lose its symmetry.

The step of heating the article at a temperature in the range $T_g$ to $T_g+100°$ C. may be carried out in the course of the rapid heating to the crystallisation temperature or it may be completed before such rapid heating is commenced.

The material, either before or during the rapid heating, thus passes through a temperature in the range $T_g$ to $T_g+100°$ C. where it is conditioned so as to ensure that fine grained crystal growth will subsequently occur satisfactorily and with minimal distortion. The time at that temperature is determined by the nature of the composition and the subsequent heating rate. It is not possible, because of the wide variety of compositions capable of being converted to glass ceramics, to give a range of conditioning times suitable for all compositions, particularly as a suitable conditioning time is determined not only by the need to obtain a useful product, but also by the total processing time which is acceptable.

There are two major factors to be considered in choosing the correct conditions for any particular composition:

(a) If crystallisation takes place too slowly or only at low viscosities, the article being treated is likely to undergo significant viscous flow under its own weight.

(b) If crystallisation takes place too rapidly or at too high a viscosity, high stresses will be generated within the article and cause distortion, or in the extreme, loss of strength or cracking.

The problem of generating stresses within the article being treated can arise not only from crystallisation taking place under viscous conditions such that the stress produced in the material by the crystal growth cannot be relaxed, but also from the formation of a temperature differential between opposite faces of the article. Thus it is important in the case of sheet material that both major faces are kept at substantially the same temperature during the heat treatment; otherwise the rate of crystallisation at one face can be greater than that at the other face, leading to distortion. It is essential to minimise temperature differentials by careful design of the heating means used, and where necessary the provision of heat shields.

Articles supported vertically should preferably be heated at such a rate that, while some elongation takes place, the rate of crystallisation is such that the actual elongation is small and for practical purposes unimportant. The presence of a small degree of fluidity is however beneficial since it allows relaxation of crystallisation stresses which would otherwise cause the article to crack or deform. Hence in the case of a material which shows a tendency to crack or bow during treatment, one must first of all ensure that the equipment is working satisfactorily and that substantial temperature gradients are not being developed, and if this is not effective, increase the heating rate so as to reduce the viscosity at which crystallisation takes place by causing crystallisation to take place at high temperatures.

The behaviour of a small piece of material can be used in determining correct conditions. In such experiments we have used a rectangular sample 4" x 1¼" with a reduced neck by which it can be suspended from tongs, so as to induce a stress which was similar to the stress which would be produced on a sheet 2' x 2' in size and 5 mm. in thickness gripped along its upper edge. The sample thus provides comparison with the effects which would be expected in sheets of commercial size. If, on heating rapidly, viscous flow occurs, one can then increase the time the sample is held between $T_g$ and $T_g+100°$ C., and if necessary use a slower heating rate. If cracking or bowing occurs to any significant extent, and a further increase in heating rate with the available equipment is not possible, then it may be necessary to use some form of heat shield to prevent the development of substantial temperature gradients.

The vitreous materials employed and the temperatures chosen for crystallisation and development of crystal centres may be similar to those described in co-pending Application Ser. No. 226,857.

To carry out the rapid heating of an article suspended in a substantially vertical attitude, any method may be used which ensures heat is supplied uniformly to the shaped article, so as to avoid the formation of substantial temperature gradients within the material. For example, we may utilise a kiln, along which the article is moved while suspended by tongs gripping an upper portion of the article. In order to ensure adequate heat transfer, an alternative is to use a fluidised solid material as the heat transfer medium.

BRIEF DESCRIPTION OF THE DRAWING

The single figure of the accompanying drawing is a diagrammatic representation of an apparatus incorporating a kiln furnace divided into various zones in which different temperature regimes exist, for carrying out the method of the invention.

DETAILED DESCRIPTION OF THE INVENTION

For convenience, the further description of our invention is couched in terms of treating sheet material. The illustrated apparatus can of course be utilised in treating other shaped vitreous articles, but is preferably used as indicated above with articles having a high degree of symmetry.

A sheet 4 of the vitreous material is suspended by tongs 5 which protrude through the roof 6 of the furnace, and which are in turn supported by a rail 7 situated above and outside the furnace. We have found it advantageous to construct the tongs from a cordierite glass ceramic material, which possesses the requisite strength at temperatures in excess of 1200° C., and has excellent resistance to thermal shock. The grip of the tongs 5 upon the sheet 4 may be improved by insertion of refractory ceramic fibre felt 8 between the tongs and sheet.

To reduce heat losses through the furnace roof, and also to stabilize the temperature distribution within the furnace, the slot in the roof through which the tongs are inserted may be blocked off by a flexible band 9 of insulating material, such as refractory ceramic blanket, attached to an endless drive belt 10 which is driven from pulleys 11 and causes the sheet 4 to travel along a horizontal path through the furnace.

In a continuous processing run i.e. when a series of sheets are to be treated, one close behind another, it can be helpful to attach a refractory shield 12, which may be of cordierite glass ceramic, before the leading face of the leading sheet, which serves to reduce the temperature gradient across the leading sheet and thus also reduces the degree of bowing.

The furnace itself is in effect divided into three zones 1,2,3, although there may be no physical barriers between the zones. Zone 1 is maintained at a temperature $T_N$ at which embryonic centres of crystal growth develop, and which lies between $T_g$ and $T_g+100°$ C., where $T_g$ is the transformation temperature of the vitreous material. In zone 2, the material is rapidly heated to the predetermined crystal growth temperature $T_C$ which for commercially useful compositions is usually between 800° C. and 1280° C. In zone 3 the material is held at that temperature to develop its final crystalline structure before passing out of the furnace. The rate of heating in zone 2 is governed by the temperature gradient set up therein and more particularly by the controlled rate of travel of the sheet 4 along the furnace.

The sheet 4 is shown positioned with its surfaces perpendicular to the longitudinal axis of the furnace, assembly, so that the thermal gradient is applied to it across the thickness of the sheet, usually about 5 mm. The sheets can alternatively be positioned with their surfaces parallel to the longitudinal axis so that the thermal gradient is applied across the breadth of the sheet.

The following table sets out, in percentages by weight, glass compositions which have been employed in producing glass ceramics by the method of the present invention. Each of these compositions contains one or more of the "nucleating" oxides $TiO_2$, $ZrO_2$ or $P_2O_5$, although compositions which are self-nucleating or which use other nucleating agents can be used. The transformation temperatures $T_g$ are also included in the table.

| Glass number | 1 | 2 | 3 | 4 | 5 | 6 | 7 | 8 | 9 | 10 | 11 |
|---|---|---|---|---|---|---|---|---|---|---|---|
| Weight, percent: | | | | | | | | | | | |
| $SiO_2$ | 78.5 | 45.5 | 68.6 | 48.5 | 66.4 | 68.6 | 66.2 | 66.2 | 59.6 | 68.0 | 64.9 |
| $Al_2O_3$ | 3.9 | 30.5 | 19.2 | 30.0 | 22.1 | 19.2 | 18.8 | 18.9 | 22.1 | 18.8 | 20.0 |
| $B_2O_3$ | | | | 6.3 | | | | | | | |
| MgO | | 12.5 | | | 1.6 | | 1.6 | 1.6 | 0.4 | 0.3 | |
| CaO | | | | | 0.1 | | 0.1 | 0.1 | | | |
| BaO | | | | | | | | | 0.4 | 0.3 | |
| ZnO | | | 3.1 | | 0.7 | 3.1 | 0.7 | 0.7 | 4.5 | 2.6 | 5.5 |
| $Li_2O$ | 12.1 | | 3.8 | 8.9 | 3.4 | 3.8 | 3.4 | 3.4 | 4.5 | 3.1 | 3.2 |
| $Na_2O$ | | | 0.4 | | 0.8 | 0.4 | 0.8 | 0.8 | | | |
| $K_2O$ | 2.5 | | 0.1 | | 0.7 | 0.1 | 0.7 | 0.7 | 1.7 | 0.7 | 0.7 |
| $As_2O_3$ | | | | | | | | | 0.5 | 0.6 | 0.5 |
| $P_2O_5$ | 3.0 | | 1.5 | | | 1.5 | | | 3.0 | 2.5 | 2.2 |
| $TiO_2$ | | 11.5 | 1.8 | | 3.8 | 3.3 | | 1.8 | 1.5 | 1.4 | 1.5 |
| $ZrO_2$ | | | 1.5 | 6.3 | 0.1 | | 7.0 | 5.2 | 1.8 | 1.7 | 1.5 |
| F | | | | | 0.1 | | 0.1 | 0.1 | | | |
| $T_g$ (°C.) | 488 | 783 | 689 | 660 | 726 | 701 | 747 | 719 | 700 | 727 | 771 |

Example 1

(i) A sheet of composition 5 was transported through zones 1 and 2 at a rate such as to cause it to be heated through the transformation temperature $T_g$ at a heating rate of 300° C./min., and held in zone 3 at a crystallisation temperature of 1070° C. for 5 mins. before removal and slow cooling. The material was a crystalline glass ceramic but the sheet had extended vertically by more than 200%.

(ii) A sheet of composition 5 was held in zone 1 for 5 minutes at 740° C., subsequently heated at a rate of 300° C./min, and held at 1070° C. for 5 minutes before removal and slow cooling. Elongation by viscous flow of 13% had occurred.

(iii) A further sheet of composition 5 was held in zone 1 for 1 hr. at 740° C., subsequently heated at a rate of 300° C./min., and held at 1070° C. for 5 minutes before removal and slow cooling. Elongation by viscous flow of 1% was noted.

(iv) Yet another sheet of composition 5 was held in zone 1 for 1 hour at 740° C., subsequently heated at a rate of 30° C./min. and held at 1070° C. for 5 minutes before removal and slow cooling. Elongation by viscous flow was of the same order as in the preceding Example 1 (iii).

Example 1 shows that by varying the time that the glass is held between $T_g$ and $T_g+100°$ C., a variation is obtained in the degree of elongation due to viscous flow during crystallisation. The same composition was treated in four different ways, and the elongation produced varied from 200° to less than 1%. It can be seen that in general, by increasing the time the product being treated is held between $T_g$ and $T_g+100°$ C., and the subsequent rate of heating, the degree of elongation can be varied. It is important to note that reducing the heating rate without increasing the time the material is held between $T_g$ and $T_g+100°$ C. may not be sufficient to produce a desired reduction in the elongation produced.

Example 2

(i) A sheet of composition 3 was taken through zones 1 and 2 at a rate such as to heat it at 300° C./min. to a temperature of 1090° C., at which it was held in zone 3 for 5 minutes before removal and slow cooling. No viscous flow had occurred, but the glass ceramic sheet obtained was noticeably bowed with some cracking.

(ii) The process of Example 2(i) was repeated using a heat shield 12 as described above and as illustrated in the drawing. In this case, the glass ceramic sheet obtained exhibited no bowing.

Example 3

(i) A sheet of composition 4, held in zone 1 for 10 minutes at 740° C., subsequently heated in zone 2 at 30° C./min. to 930° C. and held at that temperature in zone 3 for 5 minutes prior to removal and slow cooling, showed an elongation of 23%.

(ii) A further sheet of composition 4, held in zone 1 for 10 minutes at 740° C. and subsequently heated in zone 2 at 300° C./min. to 930° C. and held at that temperature in zone 3 for 5 minutes prior to removal and slow cooling, showed an elongation of only 13%. The elongation by viscous flow in composition 4 could, however, be reduced to 2% by holding for 1 hour in zone 1 prior to heating at 300° C./min.

Example 4

(i) A sheet of composition 1 was passed through zones 1 and 2 at a heating rate of 30° C./min., held in zone 3 at 860° C. for 5 minutes and removed for slow cooling. Extension by viscous flow was less than 1%.

(ii) A further sheet of composition 1 was passed through zones 1 and 2 at a heating rate of 300° C./min., held at 860° C. in zone 3 for 5 minutes and removed for slow cooling. Extension by viscous flow had increased to 7%.

(iii) A further sheet of composition 1 was held in zone 1 at 530° C. for 10 minutes, and subsequently heated in zone 2 at 300° C./min. to 860° C., and held in zone 3 at that temperature for 5 minutes. The resulting extension was again less than 1% as in Example 4(i).

Example 5

A sheet of composition 7, which is derived from composition 5 by replacing the $TiO_2$ present by $ZrO_2$, was passed through zones 1 and 2 at 300° C./min., and crystallised at 1070° C. for 5 minutes in zone 3 prior to removal. No extension could be measured, there was no cracking, but very slight bowing was noted. When this was repeated using a heat shield 12, no bowing was found.

Comparing Examples 1 and 5, it can be seen that composition 5 requires a longer processing time than composition 7. It may however be preferable from a commercial point of view to choose a longer processing time, where for example the degree of distortion obtained must be kept as small as possible.

Example 6

(i) A sheet of composition 6 was passed at a heating rate of 30° C./min. through zones 1 and 2, being held in zone 3 at 1070° C. for 5 minutes prior to removal. An elongation of 1.5% was obtained with marked bowing and some cracking.

(ii) A further sheet of composition 6 was treated similarly except for the use of a heating rate of 300° C./min. in zones 1 and 2. An extension of 4.5% was obtained, but cracking was not present and the degree of bowing had been considerably reduced.

(iii) Another sheet of composition 6 was held for 10 minutes at 780° C. in zone 1, heated in zone 2 at 300° C./min., and held at 1070° C. for 5 minutes in zone 3 before cooling. An elongation of 3.0% was obtained, but bowing was not noticeably different from the sheet in Example 6(ii) above.

(iv) Yet another sheet of composition 6 was held at 780° C. for 1½ hours in zone 1, heated in zone 2 at 300° C./min. and held at 1070° C. for 5 minutes in zone 3. This gave less than 1% extension and the same amount of bowing as in Examples 6(ii) and 6(iii).

Example 7

(i) A sheet of composition 2 was passed through zones 1 and 2 at a heating rate of 30° C./min. and held in zone 3 at 1140° C. for 5 minutes before cooling. A fine-grained bluish ceramic was produced, with less than 1% elongation and no cracking or bowing. The major crystal phase present was a $\beta$ quartz solid solution.

(ii) A further sheet of composition 2 was passed through zones 1 and 2 at a heating rate of 30° C./min. and held in zone 3 at 1250° C. for 5 minutes before removal. The resulting ceramic was bluish-white, and showed considerable cracking and bowing with less than 1% elongation. The major crystal phases present were $\beta$ quartz solid solution and high cordierite.

Example 7 illustrates a problem which can arise if compositions are chosen for treatment in which the nature of the phases separating at different crystallisation temperatures are different. In this case at 1140° C. a satisfactory product is obtained, whereas at 1250° C. the product is not suitable for commercial sale. In the latter case, transformation takes place between non-viscous essentially completely crystalline phases so that any increase in heating rate cannot improve the situation and there is no other alternative to slowing down the heating rate over the temperature range within which the crystalline transition falls. This problem may be overcome in some cases. For example, the transformation of eucryptite to spodumene occurs satisfactorily when one ensures that an essentially glassy phase is transformed directly to spodumene, with eucryptite present only as embryonic centres of crystal growth or as a minor phase. This situation is readily achieved using rapid heating methods, but is not generally possible using conventional methods.

Example 8

Sheets of composition 8 were treated in four different ways as follows:

(i) Heated to 1070° C. at 300° C./min. and held at 1070° C. for 5 minutes. The sheet of glass ceramic produced showed an extension of 13% and some bowing.

(ii) Heated to 1070° C. at 30° C./min. and held at 1070° C. for 5 minutes. The sheet of glass ceramic produced showed an extension of less than 1% but more bowing than 8(i).

(iii) Held at 740° C. for 10 minutes, then heated at 300° C./min. to 1070° C. and held for 5 minutes at 1070° C. The glass ceramic sheet produced showed an extension of less than 1% and less bowing than 8(ii).

(iv) The treatment was the same as for 8(iii) but with a heat shield 12. Extension was negligible (less than 1%) and no bowing occurred.

Example 9

(i) A sheet of composition 9 was transported through zones 1 and 2 so as to heat it at a rate of 180° C./min. to a crystallisation temperature of 870° C., at which it was held in zone 3 for 5 minutes. The material obtained was a dense white glass ceramic, with an extension of 4%, no cracking but considerably bowed.

(ii) A sheet of composition 9 was treated similarly but using a heat shield 12 and a reduced heating rate of 100° C./min. The product was similar but unbowed.

(iii) Using a heat shield 12, a sheet of composition 9 was held in zone 1 at 800°C. for 5 minutes, then heated in zone 2 at 115° C./min. to 870° C. and held at that temperature in zone 3 for 5 minutes. A dense white glass ceramic was obtained with less than 1% extension and no cracking or bowing.

(iv) Still using a heat shield 12, a sheet of composition 9 was held in zone 1 at 700° C. for 5 minutes, heated in zone 2 at 30° C./min. to 790° C. and held in zone 3 at that temperature for 1 hour. The product was a highly translucent glass ceramic with an elongation of less than 1% and no cracking or bowing.

Example 10

Five sample sheets of composition 10 were treated, using a heat shield 12.

(i) The first sample was transported through zones 1 and 2 so as to heat it at 100° C./min. to 1000° C. and held in zone 3 at that temperature for crystallisation for 5 minutes, giving a grey translucent glass ceramic with an extension of 15%.

Subsequent samples were held in zone 1 at 800° C. for varying times to give more time for development of a uniform dispersion of embryonic centres of crystal growth, so reducing the extension. The heat-treatment schedules and extension found were:

| | Zone 1 | Zone 2 (heating rate) | Zone 3 (crystallisation) | Extension, percent |
|---|---|---|---|---|
| (ii) | 5 mins. at 800° C. | 55° C./min. | 5 mins. at 1,000° C. | 2 |
| (iii) | 10 mins. at 800° C. | 100° C./min. | 5 mins. at 1,000° C. | 2 |
| (iv) | 5 mins. at 800° C. | 30° C./min. | 5 mins. at 1,000° C. | 1 |
| (v) | 30 mins. at 800° C. | 80° C./min. | 5 mins. at 1,000° C. | 1 |

The product in each case was a grey translucent glass ceramic, with no cracking or bowing.

Example 11

Five sample sheets of composition 11 were treated, using a heat shield 12.

(i) The first sample was transported through zones 1 and 2 so as to heat it at 95° C./min. to 1000° C. and was held at 1000° C. in zone 3 for 5 minutes for crystallisation. A greyish-white translucent glass ceramic was obtained, showing an extension of 5%.

Subsequent samples were held in zone 1 for varying times, the heat-treatment schedules and extension being as follows:

| | Zone 1 | Zone 2 (heating rate) | Zone 3 (crystallisation) | Extension, percent |
|---|---|---|---|---|
| (ii) | 5 mins. at 800° C. | 100° C./min. | 5 mins. at 1,000° C. | 5 |
| (iii) | 5 mins. at 800° C. | 30° C./min. | 5 mins. at 1,000° C. | 2½ |
| (iv) | 30 mins. at 800° C. | 30° C./min. | 5 mins. at 1,000° C. | 1 |
| (v) | 30 mins. at 800° C. | 90° C./min. | 5 mins. at 1,000° C. | 1 |

The product in (ii) was similar to that in (i). In (iii), (iv) and (v) it was darker in colour but still translucent. No cracking or bowing occurred in any of the samples.

We claim:

1. In a method of manufacturing a fine-grained glass ceramic article from a thermally-crystallizable vitreous material, wherein the vitreous material is shaped to form a shaped article, the article is initially heated to a temperature in the range $T_g$ to $T_g + 100°$ C. where $T_g$ is the transformation temperature of the vitreous material, to condition the material, by generating therein a uniform dispersion of embryonic centers of incipient crystal growth, for subsequent crystallization, and the article is rapidly heated at a rate of at least 30° C. per minute to a predetermined crystallization temperature to effect fine-grained crystal growth on those embryonic centers, the improvement wherein the article is shaped into an article having a major axis or plane about which the article is symmetrical and the article is heated to said crystallisation temperature while the article is suspendingly supported with said major axis or plan of symmetry, extending downwardly and disposed in a substantially vertical attitude, without support of the glass against deformation, the glass being sufficient fluid so that crystallisation takes place with stress relief.

2. A method according to Claim 1, wherein the initial heating of the article to a temperature in the range $T_g$ to $T_g+100°$ C. is carried out in the course of the rapid heating to the crystallization temperature.

3. A method according to Claim 1, wherein the initial heating of the article to a temperature in the range $T_g$ to $T_g+100°$ C. is completed before the rapid heating to the crystallization temperature.

4. A method according to Claim 1, wherein the article is suspended during the initial heating to a temperature in the range $T_g$ to $T_g+100°$ C. as well as the rapid heating to the crystallisation temperature.

5. A method according to Claim 1, wherein the article is suspended by tongs which grip an upper portion of the article.

6. A method according to Claim 5, wherein the tongs are made of a cordierite glass ceramic material.

7. A method according to claim 5, wherein strips of refractory ceramic fibre felt material are interposed between the sheet and the tongs.

8. A method according to Claim 1, wherein the article is a sheet which is suspended and transported through a furnace which is divided into zones at different temperatures so as to subject the suspended sheet first to the initial heating to the temperature in the range $T_g$ to $T_g+100°$ C., following by the rapid heating to the crystallization temperature.

9. A method according to Claim 8, wherein the furnace is divided into three heated zones, and wherein the suspended sheet is transported therebetween at such a speed as to be first subjected to the initial heating to the temperature in the range $T_g$ to $T_g+100°$ C. in the first heated zone, then to the rapid heating as it passes through the second zone and wherein the sheet is held at the crystallisation temperature for a predetermined time in the third zone.

10. A method according to Claim 8, wherein a heat shield is suspended in front of the sheet and transported with said sheet through the furnace, thereby to reduce development of temperature differentials across said sheet.

References Cited
UNITED STATES PATENTS

| | | | |
|---|---|---|---|
| 3,464,807 | 9/1969 | Pressav | 65—33 |
| 3,119,680 | 1/1964 | Do Huu Chan et al. | 65—115 X |
| 3,392,006 | 7/1968 | Seymour | 65—118 |

S. LEON BASHORE, Primary Examiner

F. W. MIGA, Assistant Examiner

U.S. Cl. X.R.

65—118